United States Patent
Törnström (10) Patent No.: US 9,457,410 B2
(45) Date of Patent: Oct. 4, 2016

(54) CUTTING TOOL AS WELL AS A HOLDER BLADE THEREFOR

(71) Applicant: SANDVIK INTELLECTUAL PROPERTY AB, Sandviken (SE)

(72) Inventor: Roger Törnström, Årsunda (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 363 days.

(21) Appl. No.: 14/074,061

(22) Filed: Nov. 7, 2013

(65) Prior Publication Data
US 2014/0126969 A1    May 8, 2014

(30) Foreign Application Priority Data
Nov. 8, 2012    (SE) .................................. 1251266-1

(51) Int. Cl.
| | |
|---|---|
| B23B 27/04 | (2006.01) |
| B23B 5/00 | (2006.01) |
| B23B 29/24 | (2006.01) |
| B23B 29/06 | (2006.01) |
| B23B 5/14 | (2006.01) |
| B23B 25/06 | (2006.01) |
| B23B 27/08 | (2006.01) |

(52) U.S. Cl.
CPC ............... *B23B 29/248* (2013.01); *B23B 5/14* (2013.01); *B23B 25/06* (2013.01); *B23B 27/086* (2013.01); *B23B 29/06* (2013.01); *B23B 2205/02* (2013.01); *B23B 2210/027* (2013.01); *B23B 2260/12* (2013.01); *B23B 2260/136* (2013.01); *Y10T 407/227* (2015.01); *Y10T 407/2244* (2015.01)

(58) Field of Classification Search
CPC .. F16B 21/09; F16B 2143/003; B23B 29/04; B23B 29/043; B23B 29/246; B23B 29/248; B23B 29/06; B23B 29/14; B23B 25/06; B23B 27/04; B23B 27/025; B23B 2205/02; B23B 210/027; B23B 2210/08
USPC ........ 407/117, 101, 106, 110, 109, 107, 111, 407/88; 82/113
See application file for complete search history.

(56) References Cited

U.S. PATENT DOCUMENTS

| | | | | |
|---|---|---|---|---|
| 1,075,450 | A | * 10/1913 | Osdel | ...................... B23B 29/14 407/76 |
| 1,502,712 | A | * 7/1924 | Chard | ..................... B23B 29/06 82/137 |

(Continued)

FOREIGN PATENT DOCUMENTS

| | | | | |
|---|---|---|---|---|
| DE | 1552292 A1 | * 10/1969 | ............. | B23B 27/04 |
| DE | 2642186 A1 | * 3/1978 | ............. | B23B 27/08 |

(Continued)

*Primary Examiner* — Sara Addisu
(74) *Attorney, Agent, or Firm* — Corinne R. Gorski (57) ABSTRACT

A cutting tool for tube cutting machines includes a tool holder and a dismountable holder blade having replaceable cutting inserts. The tool holder includes a basic body, as well as a support body for the holder blade. There is arranged between the basic body and the support body a set-up body, by means of which the support body, and thereby the holder blade, can be set and fixed in the exact, desired spatial positions in the machine without time-consuming measuring and fine adjustment operations. In addition, the holder blade is fixed in the support body by means of a single simple screw, which allows a flexible mounting and dismounting of the same.

10 Claims, 8 Drawing Sheets

(56) References Cited

U.S. PATENT DOCUMENTS

| | | | | |
|---|---|---|---|---|
| 2,101,157 A * | 12/1937 | Redinger | B23B 29/06 | 82/161 |
| 2,360,137 A * | 10/1944 | Jennings | B23B 29/06 | 407/78 |
| 2,877,536 A * | 3/1959 | Monosmith | B23B 27/1633 | 407/110 |
| 3,078,547 A * | 2/1963 | Sweet | B23B 29/248 | 407/68 |
| 3,125,798 A * | 3/1964 | Stein | B23B 27/04 | 407/101 |
| 3,152,386 A * | 10/1964 | Robbins | B23B 29/043 | 407/117 |
| 3,497,935 A * | 3/1970 | Bowling | B23B 27/04 | 407/108 |
| 3,529,860 A * | 9/1970 | Jelley | F16B 21/09 | 160/402 |
| 3,531,842 A * | 10/1970 | Bowling | B23B 27/04 | 407/101 |
| 3,551,977 A * | 1/1971 | Novkov | B23B 29/043 | 407/103 |
| 3,596,337 A * | 8/1971 | Arnold | B23B 27/08 | 407/117 |
| 3,603,185 A | 9/1971 | Curry | | |
| 3,611,525 A * | 10/1971 | Cochran | B23B 27/04 | 407/113 |
| 3,662,445 A * | 5/1972 | Whitaker | B23B 27/1685 | 407/111 |
| 3,688,366 A * | 9/1972 | Jones | B23B 29/043 | 407/101 |
| 3,758,927 A * | 9/1973 | Stein | B23B 27/04 | 407/101 |
| 3,763,727 A * | 10/1973 | Hoke | B23B 29/14 | 407/10 |
| 3,780,408 A * | 12/1973 | McCreery | B23B 29/043 | 407/101 |
| 3,802,042 A * | 4/1974 | Novkov | B23B 27/04 | 407/101 |
| 4,051,584 A * | 10/1977 | Huser | B23B 27/04 | 407/107 |
| 4,227,838 A * | 10/1980 | Berry | B23B 29/043 | 407/101 |
| 4,332,513 A * | 6/1982 | Gowanlock | B23B 27/04 | 407/101 |
| 4,520,701 A * | 6/1985 | Watamura | B23B 29/244 | 82/158 |
| 4,593,467 A * | 6/1986 | Safar | B23B 51/05 | 30/300 |
| 4,744,703 A * | 5/1988 | Cochran | B23C 5/2437 | 407/112 |
| 4,938,641 A | 7/1990 | Maier | | |
| 5,097,879 A * | 3/1992 | Rice, Sr. | B27L 11/005 | 144/162.1 |
| 5,119,703 A * | 6/1992 | Ruby | B23B 29/24 | 407/68 |
| 5,159,863 A * | 11/1992 | Simpson, III | B23B 27/04 | 407/101 |
| 5,516,241 A * | 5/1996 | Plutschuck | B23B 27/04 | 407/110 |
| 5,688,080 A * | 11/1997 | Hedlund | B23B 27/04 | 407/101 |
| 5,709,508 A * | 1/1998 | Barazani | B23B 27/045 | 407/101 |
| 5,980,165 A * | 11/1999 | Hansson | B23B 27/04 | 407/107 |
| 5,996,654 A * | 12/1999 | Green | F16L 37/1215 | 141/383 |
| 6,113,319 A * | 9/2000 | Hansson | B23B 29/04 | 407/109 |
| 6,126,364 A * | 10/2000 | Riviere | B23D 43/04 | 407/15 |
| 6,186,704 B1 * | 2/2001 | Hale | B23B 27/04 | 407/101 |
| 6,196,758 B1 * | 3/2001 | Scarborough | F16B 21/09 | 403/109.3 |
| 7,682,109 B2 * | 3/2010 | Hecht | B23B 27/007 | 407/102 |
| 2003/0024206 A1* | 2/2003 | Polevoy | F16B 21/09 | 52/848 |
| 2006/0257217 A1* | 11/2006 | Berminge | B23B 27/04 | 407/117 |
| 2007/0110526 A1* | 5/2007 | Nicholas | B23B 27/08 | 407/110 |
| 2007/0215780 A1* | 9/2007 | Eichert | A47G 1/142 | 248/497 |
| 2010/0135736 A1* | 6/2010 | Hecht | B23B 27/04 | 407/86 |
| 2011/0094356 A1* | 4/2011 | Howerton | B23B 29/244 | 82/160 |
| 2011/0110733 A1* | 5/2011 | Hecht | B23B 27/1614 | 407/103 |
| 2012/0321230 A1* | 12/2012 | Chen | A47B 88/0418 | 384/41 |
| 2013/0051938 A1* | 2/2013 | Satran | B23C 5/08 | 407/48 |
| 2014/0161547 A1* | 6/2014 | Kaufmann | B23B 27/1666 | 407/72 |
| 2015/0003924 A1* | 1/2015 | Jansson | B23B 27/16 | 407/110 |
| 2015/0063929 A1* | 3/2015 | Hecht | B23B 27/04 | 407/67 |
| 2015/0086282 A1* | 3/2015 | Zeeb | B23B 27/04 | 407/34 |

FOREIGN PATENT DOCUMENTS

| | | | | |
|---|---|---|---|---|
| GB | 548910 A | * | 10/1942 | F16B 5/10 |
| GB | 810512 A | * | 3/1959 | B23B 27/08 |
| IL | WO 2013132480 A1 | * | 9/2013 | B23B 27/086 |
| JP | 08215904 A | * | 8/1996 | |
| NL | EP 0109719 A1 | * | 5/1984 | B23B 27/04 |
| SE | EP 1025939 A1 | * | 8/2000 | B23B 27/045 |
| WO | 2006118506 A1 | | 11/2006 | |

* cited by examiner

CUTTING TOOL AS WELL AS A HOLDER BLADE THEREFOR

RELATED APPLICATION DATA

This application claims priority under 35 U.S.C. §119 to SE Patent Application No. 1251266-1 filed on Nov. 8, 2012, which the entirety thereof is incorporated herein by reference.

SUMMARY

In a first aspect, a cutting tool includes a tool holder and a holder blade formed with at least one seat for a replaceable cutting insert is provided. The holder blade has an elongate basic shape and includes two plane-parallel side surfaces, two opposite and mutually parallel longitudinal edges, as well as two opposite ends. The tool holder includes a basic body and a support body, which includes a slot countersunk in a front side turned from the basic body. The slot includes a bottom and two separated side limiting surfaces, and in which the holder blade is detachably mounted. The holder blade is adjustable and fixable in different axial projection positions in relation to the basic body. In a further aspect, a holder blade as such is also disclosed.

BACKGROUND

Cutting tools of the type generally mentioned above are useful in machines for the cutting of tubes of metal by parting and grooving. Such machines include a fixed front frame having a central opening, from the inner edge of which a plurality of tools project pointing toward a center where the tube is located. In the machine, a rotor unit is furthermore included to set the tube piece in rotation, as well as a number of feeding devices interacting with the cutting tools, e.g., ball roller screws, which have the purpose of feeding in the tools and their holder blades linearly toward the tube. The replaceable cutting inserts of the holder blades enter the envelope surface of the tube to successively cut through the tube wall and finally entirely cut off the tube. Often, four tools having a pitch of 90° are included. For several reasons, it is important that the active cutting inserts of the holder blades during operation are kept located at exactly the same radial distance from the tube. Thus, it is important that individual cutting inserts are not loaded harder than others, and that all active cutting inserts become worn essentially uniformly. In such a way, the cutting inserts obtain the same service life so that they can be replaced simultaneously.

The tool holders for previously know, open use, tools of this type include a support body for the mounting of the holder blade in the form of a plate, which in a front side includes a slot, in which the holder blade can be fixed, and on a back side includes an integrated cam having a cross-sectional V-shaped outer edge, which fits into a dovetail-shaped slot in the basic body. In the same dovetail slot, there is also housed a movable clamping wedge that interacts with two screws, which are accessible from the front side of the support body and by means of which the same can be pressed out toward the opposite outer edge of the dovetail slot and thereby wedge up the support body in a desired axial position in relation to the basic body. The holder blade in turn is fixed in a desired axial position in relation to the support body in the external slot by means of a plurality of (usually at least three) clamping jaws, which apply an uniformly distributed clamping force to an upper longitudinal edge along the blade, whereby a cross-sectional V-shaped lower longitudinal edge is pressed against an inclined, lower interface of the slot.

A disadvantage of previously known cutting tools of the kind in question is that replacement of cutting inserts and/or holder blades is intricate and time-consuming, more precisely as a consequence of the holder blade being freely movable in the appurtenant slot in the support body as soon as the securing clamping jaws have been disengaged. This means that the exact, radial distance of the different holder blades and cutting inserts from the tube to be machined has to be determined by manual measuring and fine adjustment of the axial position of the holder blade along the support body. Because the positional accuracy of the cutting inserts is in the order of 0.1 mm, it is easily realized that the operation of setting the holder blades in, for instance, four tangentially spaced-apart tools becomes difficult and time-consuming. Thus, in practice, insert replacements or work in connection with adjustment of the machine for different tube dimensions, may require 1-2 hours. This should be compared to the normal service life of the individual cutting inserts, which most often is within the range of 10-15 minutes. The set-up times of the machine between periods of operative running are accordingly disproportionately long, and entail considerable costs.

The present disclosure aims at avoiding the above-mentioned disadvantage of previously known cutting tools by providing an improved cutting tool. Therefore, a cutting tool, the holder blade of which can be dismounted and remounted without the need of repeated line ups and fine adjustments of its axial position is provided. An additional object is to make the exact positioning of the cutting inserts more effective in relation to the centre of the machine in connection with the occasions when the dimensions of the tube or work piece require adjustment of the tool, or when other cutting inserts and/or holder blades need to be mounted in the tool.

Accordingly, a set-up body is arranged between the basic body and the support body. The set-up body is actuated by a spring device aiming to displace the set-up body axially in relation to the basic body, and against the action of which the set-up body is fixable in a desired position in relation to the basic body by means of a screw joint, besides which the holder blade is fixed in a predetermined position in the slot of the support body by means of a stop member including a screw that extends so through a through hole in the holder blade and is tightened in a threaded hole that mouths in a bottom of the slot.

In one embodiment, the width of the slot between the border edges thereof is greater than the width of the holder blade between the two longitudinal edges, so as to allow mounting and dismounting of the holder blade with a side surface facing the bottom of the slot. In addition, the through hole in the holder blade has a keyhole-like contour shape by including on one hand a circular section, the diameter of which is greater than the diameter of a head of the screw, and on the other hand an elongate section that extends from the round section to an end surface and has a width that is smaller than the diameter of the screw head. In such a way, dismounting of the holder blade is allowed by the simple measure of loosening the screw a turn or so and displacing the blade in such a way that the round section of the hole ends up in line with the screw head, wherein the last-mentioned one can pass through the hole when the blade is brought out of the slot. In a reverse way, the holder blade can be remounted in the slot in order to, after tightening of the screw, recapture its exact radial position in relation to the center of the machine.

In yet another embodiment, the holder blade includes seats and cutting inserts at the two ends thereof. The key hole includes two diametrically opposed, elongate sections running from a common, circular section. The end surfaces of the elongate sections are situated at one and the same axial distance from an adjacent seat and cutting insert, respectively. In such a way, changing of the two cutting inserts can be carried out quickly and easily without the exact positioning thereof in relation to the machine center being lost.

In still another embodiment, the holder blade includes seats and cutting inserts at the two ends thereof, the blade having two separate through holes having a keyhole-like contour, each keyhole-like contour including a single elongate section running from a circular section, the end surfaces of each elongate section being situated at the same axial distance from an adjacent seat and cutting insert, respectively. Also in this embodiment, changing of the two cutting inserts can be carried out quickly and easily without the exact positioning thereof in relation to the no machine center being lost. In addition, the end surface of each elongated section can be placed closer to the free end of the blade without weakening the blade.

In another embodiment, the set-up body of the tool holder comprises means for detachably receiving a projecting sensor having the purpose of determining the position of the detached and spring-loaded set-up body in relation to the basic body depending on the distance to a work piece. Because the sensor is detachably connected with the set-up body, the same can be quickly and easily removed from the set-up body after completion of task, in order not to interfere with the machining operation.

The present embodiments eliminate the need to line up and finely adjust the holder blade in relation to the appurtenant support body and instead moving the requisite setting function to a set-up body that is arranged between the support body and the basic body and in relation to which the support body assumes a fixed axial position as soon as the setting operation has been carried out.

DETAILED DESCRIPTION

Figure 1:
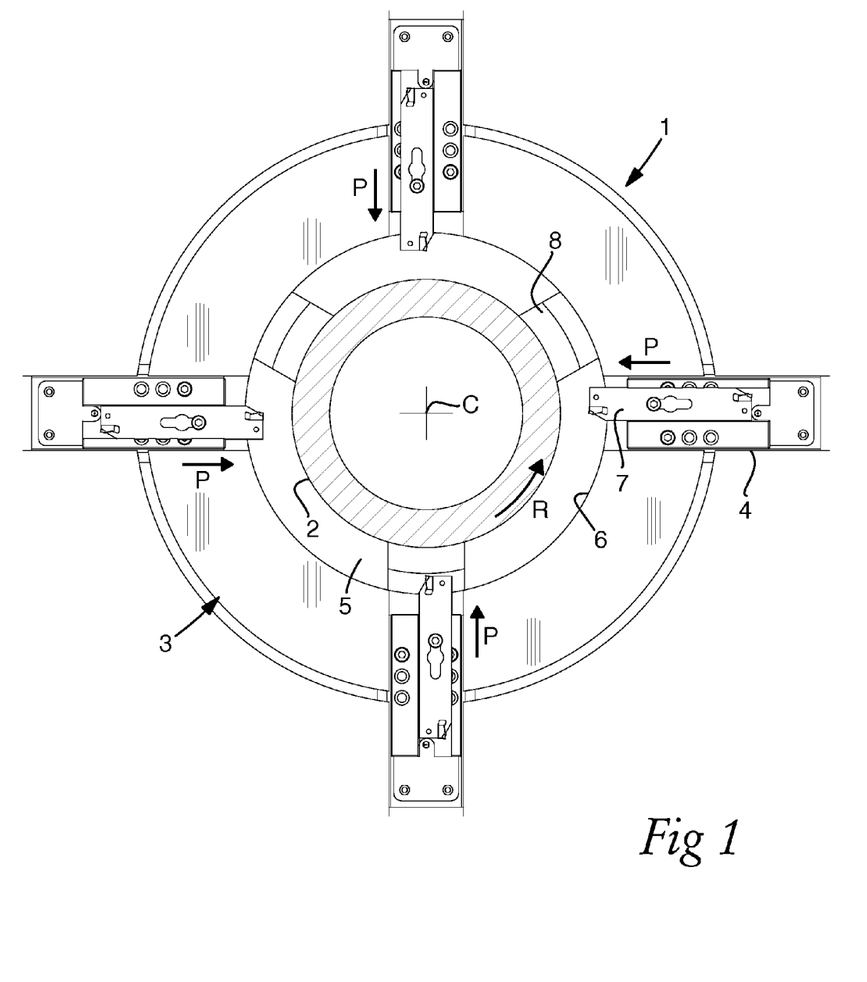
FIG. 1 is a schematic front view of a tube cutting machine, in which a plurality of cutting tools according to an embodiment of the present disclosure are included.

In FIG. 1, numeral 1 generally designates a machine, by means of which a metal tube 2 or another elongate, cylindrical work piece can be cut off, more precisely by a so-called parting operation. In a front frame 3 forming a part of the machine, a plurality of peripherally separated cutting tools 4 are mounted. In the example, four tools are included in the machine, which are placed at a pitch of 90°. Each tool is connected with a feeding device (not shown), e.g., a ball roller screw, by means of which linear feeding motions can be applied to the tools in the direction of the arrows P, i.e., toward (and from) a center axis C of the machine. In the front frame 3, a central opening 5 is included, which is delimited by a circumferential hole edge surface 6, in relation to which so-called holder blades, which are included in the tools, can project radially in the direction inward toward the center axis C. By means of a rotor unit, not visible, the tools can be set in rotation, more precisely in the direction of the arrow R.

Figure 2:
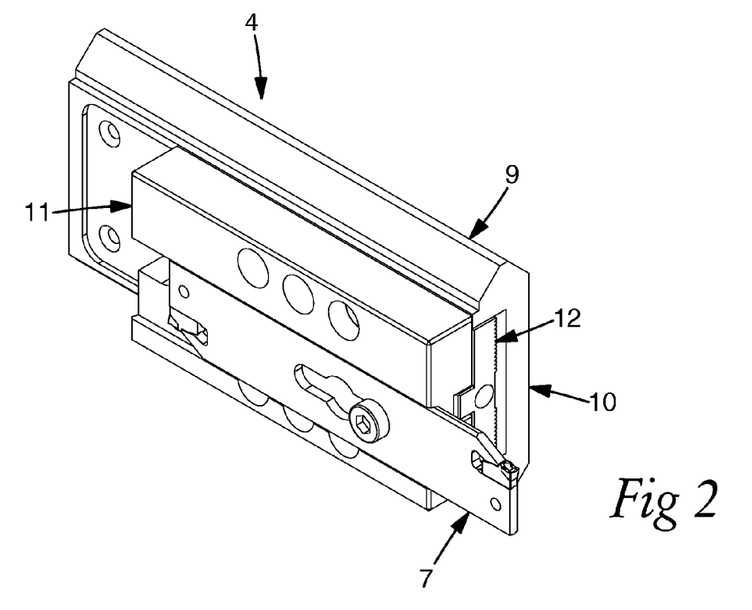
FIG. 2 is a perspective view of an individual tool ready for the parting of a tube applied in the machine.

Reference is now made to FIG. 2, which shows how the individual tool 4, in addition to the holder blade 7, includes a tool holder in its entirety designated 9, which is composed of three different main components, viz. a basic body 10, a support body 11, and a set-up body 12. The bodies 10, 11, 12 have a flat, parallelepipedic basic shape and will therefore henceforth be denominated "plates". Also the holder blade 7 is of the same basic shape, although this is thinner than the plates.

Figure 4:
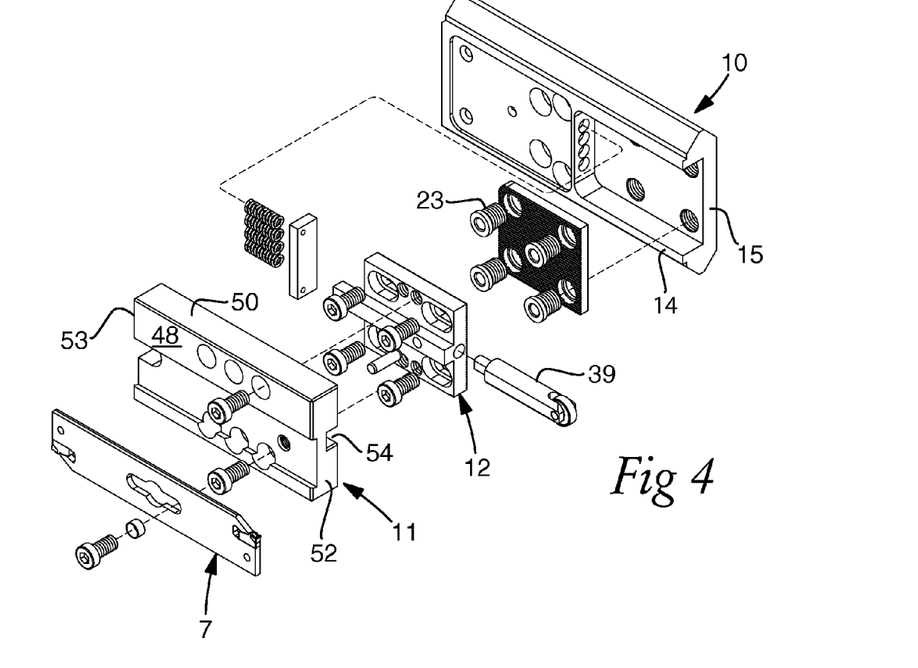
FIG. 4 is a perspective exploded view showing different components forming parts of the tool, as viewed from the top and front.
Figure 5:
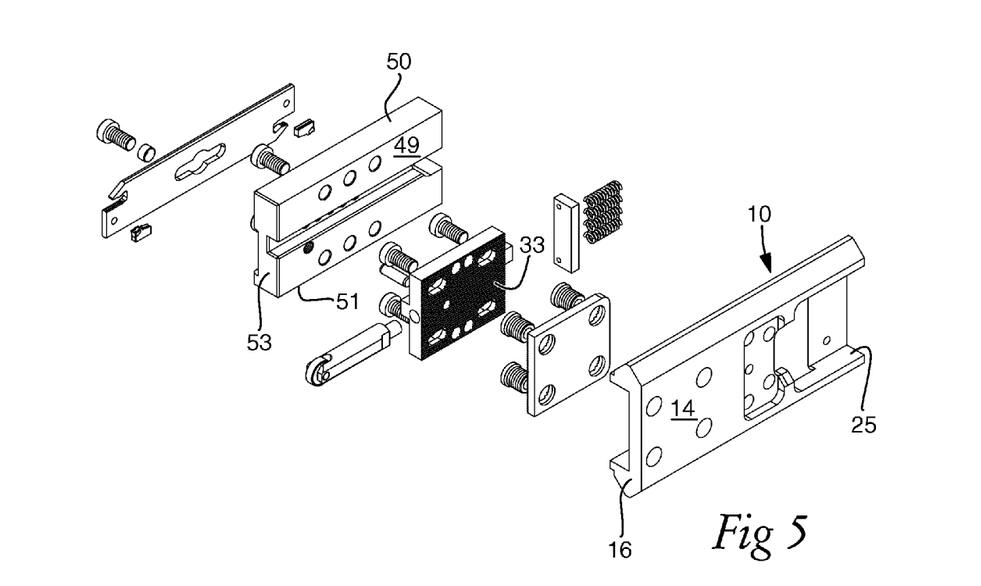
FIG. 5 is a perspective exploded view showing the components of FIG. 4 from behind.

Reference is now made to FIGS. 4 and 5, which in compilation illustrate the components forming parts of the tool shown from the front as well as from behind. The components are also illustrated individually in an enlarged state in FIGS. 6-10, the selected perspective being the same as in FIG. 4.

Figure 6:
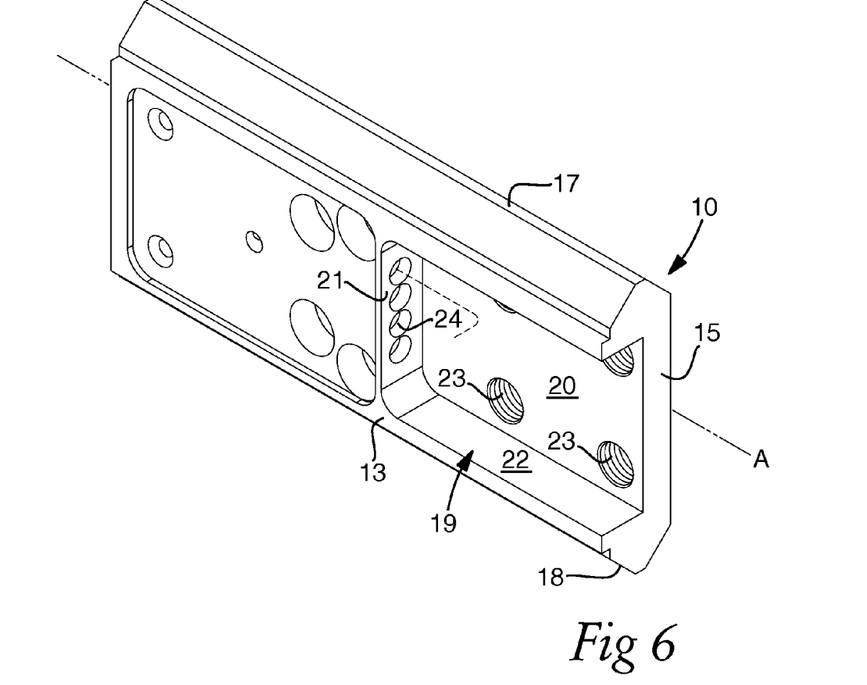
FIG. 6 is an enlarged perspective view of a basic body forming a part of the tool as viewed in the same perspective as in FIG. 4.

As seen in FIGS. 4 and 5 in combination with FIG. 6, the base plate 10 includes two plane-parallel surfaces 13, 14, which extend between two plane end surfaces 15, 16, and one 13 of which forms a front side and the other one 14 a back side. In addition, the base plate 10 is delimited by two mutually parallel, upper and lower longitudinal edges 17, 18, which are cross-sectional V-shaped to guide the base plate linearly in relation to a guide forming a part of the machine frame in connection with the reciprocating feeding motions of the tool. These longitudinal edges 17, 18 are also parallel to an imaginary axis A, which defines an axial extension of the base plate 10 as well as of the tool holder 9 in its entirety. Adjacent to the end surface 15, in the front side 13, a cavity 19 is recessed, which in addition to a plane bottom 20 is delimited by an end wall 21 and two parallel side walls 22. In the bottom 20, four threaded holes 23 are mouthing. In the end wall 21, a number of cylindrical seats 24 are furthermore mouthing. As seen in FIG. 5, a cavity 25 is also recessed in the back side 14 of the base plate. This cavity has the purpose of receiving a coupler (not shown) to couple together the base plate with the feeding device that provides for the feeding motions of the tool.

Figure 7:
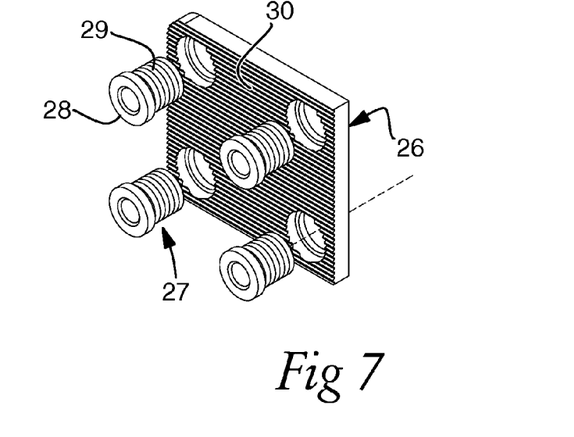
FIG. 7 is a perspective exploded view showing a bottom plate mounted in the basic body.

As further seen in FIGS. 6 and 7, a bottom plate 26 is permanently mounted in the cavity 19, more precisely by being held pressed against the bottom 20 by means of four tubular screws 27, which, in addition to a head 28, include on one hand an external thread 29 for the tightening in an interacting hole 23, and on the other hand an internal thread (not visible). The front side of the bottom plate 26 is a so-called serration surface 30, of the type that includes long narrow ridges and grooves having a straight shape. The heads 28 are countersunk in relation to the serration surface 30, when the tubular screws have been tightened in the threaded holes 23.

The set-up plate 12 (see FIG. 8 in combination with FIGS. 4 and 5) includes four elongate holes 31, which extend all the way through between the front side 32 and back side 33 of the plate. The holes 31 are intended for fixing screws 34, the male threads of which can be tightened in the female threads of the tubular screws 27. These fixing screws 34 are provided with heads 35, which are pressable against countersunk shoulder surfaces 36 in the holes 31. In one of two opposite, plane end surfaces 37, there mouths a cylindrical seat 38 for the receipt of a detachably mounted sensor 39, the function of which will be described later. The back side 33 of the set-up plate 12 (see FIG. 5) is in the form of a serration surface arranged to co-operate with the serration surface 30 of the bottom plate 26. When the ridges of one serration surface engage the grooves of the other, a distinct rectilinear guiding of the set-up plate is obtained, when the same should be displaced axially in relation to the base plate. In the front side 32 of the set-up plate 12, there is formed an axially running ridge 40, the length of which may be greater than the length of the proper set-up plate 12. In the crest surface 41 of the ridge 40, there mouths a seat 42 for a pin 43 having a conical, free end 44. In addition, two pairs of through, threaded holes 45 extend between the front and back sides of the set-up plate. With the set-up plate 12, a spring device interacts in the form of a slat 46 and a plurality of compression springs 47 that act against the slat. More precisely, four helicoidal springs are arranged, which are mounted in the seats 24 that mouth in the end surface 21 of the cavity 19. The spring device always aims to displace the set-up plate 12 toward the end surface 15 of the base plate 10.

Figures 8, 9:
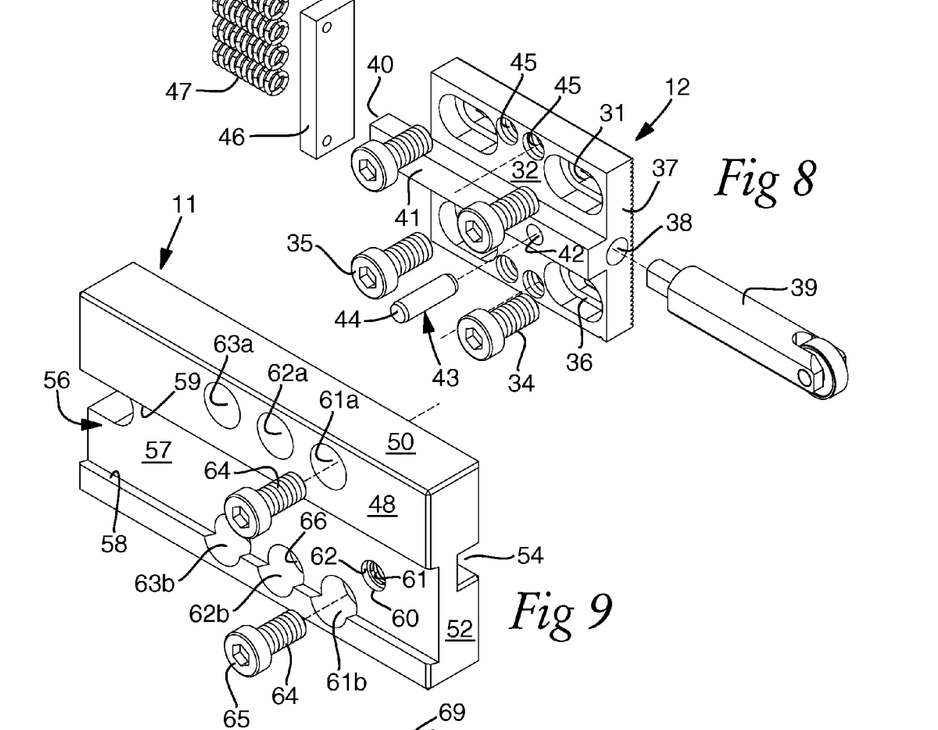
FIG. 8 is a perspective exploded view showing a set-up body forming a part of the tool as well as a spring device and a sensor interacting with the set-up body.
FIG. 9 is a perspective view of a support body intended for a holder blade.
Figure 13A:
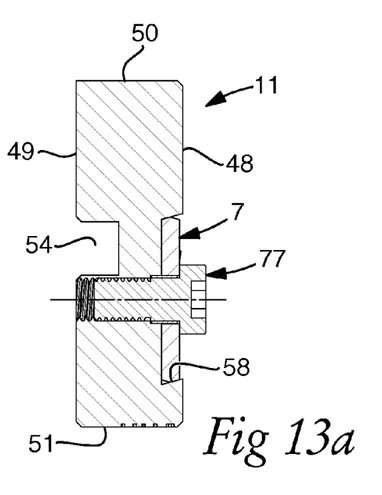
FIG. 13a is an enlarged cross-sectional view taken along line XIII-XIII of FIG. 12.
Figure 13B:
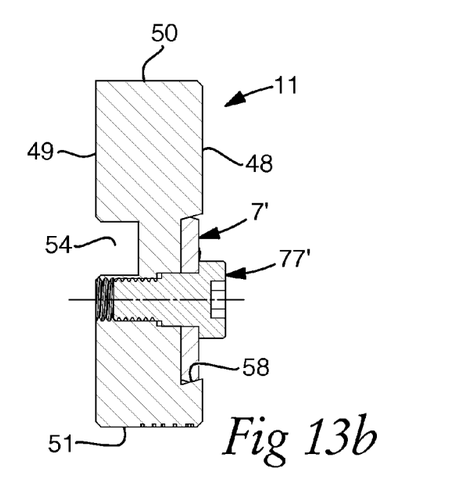
FIG. 13b is an enlarged cross-sectional view taken along line XIII-XIII of FIG. 12 with a holder blade and screw as shown in FIG. 10b.
Figure 14:
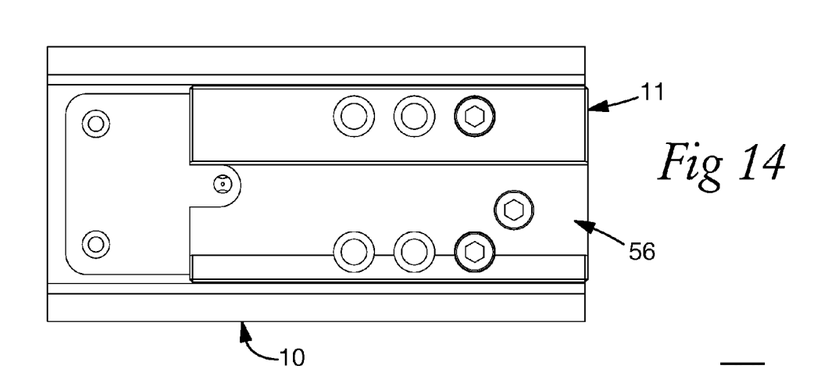
FIG. 14 is a view showing solely the support body in a state connected with the basic body.
Figure 15:
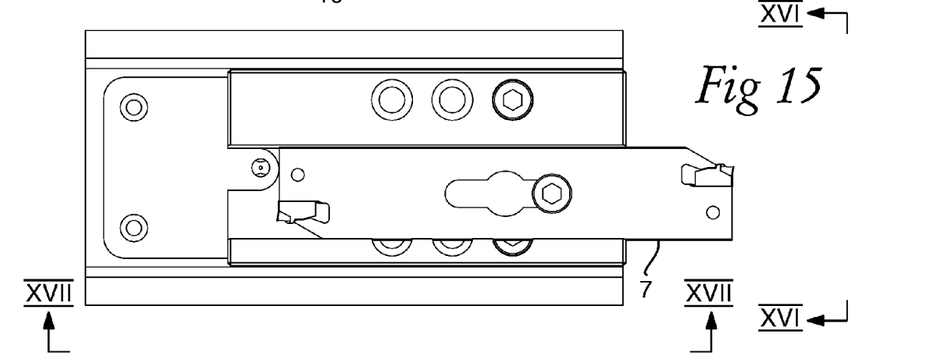
FIG. 15 is a view corresponding to FIG. 14, but having a holder blade mounted on the support body.
Figure 16:
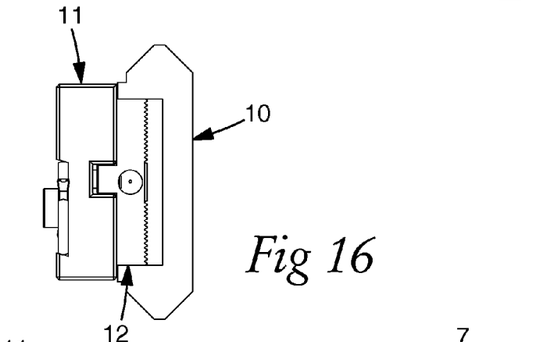
FIG. 16 is an end view from line XVI-XVI in FIG. 15.

In FIG. 9 in combination with FIGS. 4 and 5, it is seen that the parallelepipedic support plate 11 includes two plane-parallel surfaces 48, 49, the first-mentioned one of which forms a front side and the last-mentioned one a back side. In other respects, the support plate is delimited by upper and lower edge surfaces 50, 51 (see also FIGS. 13a and 13b), and two opposite, plane end surfaces 52, 53.

Figure 11:
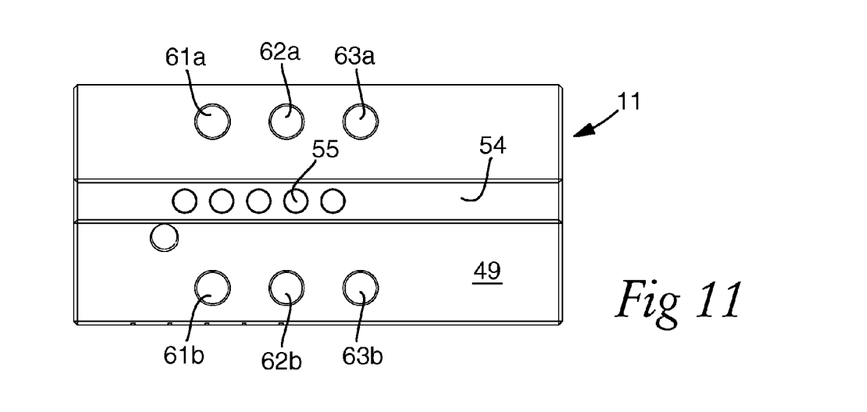
FIG. 11 is a side view of the support body of the tool holder as viewed from behind.
Figure 12:
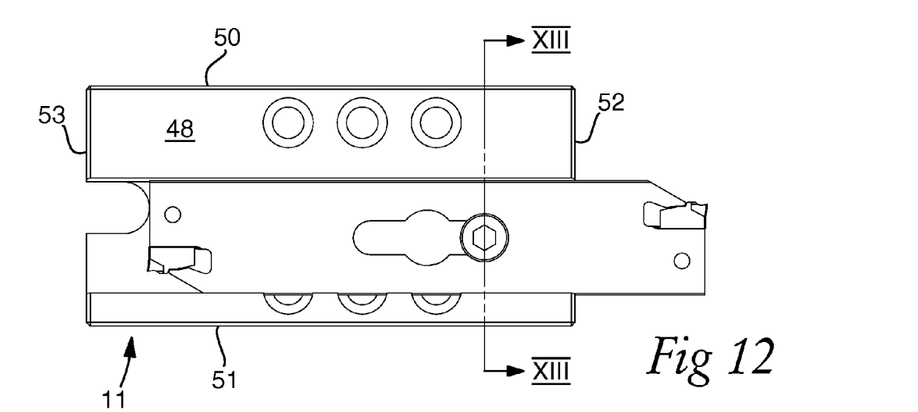
FIG. 12 is a side view from the front of the support body having a fitted holder blade.

In the back side 49 of the support plate 11, an axially running chute 54 is formed, in which the ridge 40 of the set-up plate 12 can engage to form a guide between the two plates. As may be best seen in FIG. 11, a plurality of (in the example five) axially separated seats in the form of shallow pits 55 having a spherical shape are formed in the bottom of the chute 54. The pin 43 can be brought in engagement with optional pit 55.

In the front side 48 of the support plate 11, a slot 56 is formed for the receipt of the holder blade 7. This slot 56 is delimited by a plane bottom surface 57 and two edge surfaces 58, 59, which are running parallel to each other and the lower one 58 of which is inclined at an acute angle in relation to the bottom surface 57 (see FIGS. 13a and 13b). As can be best seen in FIG. 9, a threaded hole 60 mouths in the bottom surface 57 of the slot. More precisely, the hole includes a female thread 61, which is countersunk in the hole to be spaced apart from the plane of the bottom surface via an unthreaded, cylindrical surface 62 having a greater inner diameter 255 than the thread 61.

In the support plate 11, three pairs of through holes 61a/61b, 62a/62b, and 63a/63b are furthermore included, for a pair of fixing screws 64 having a head 65 each, which has a cylindrical shape. In each one of said holes, there is a ring-shaped shoulder surface (outlined at 66), against which the head of the screw can be tightened in a countersunk state.

Figures 10A, 10B:
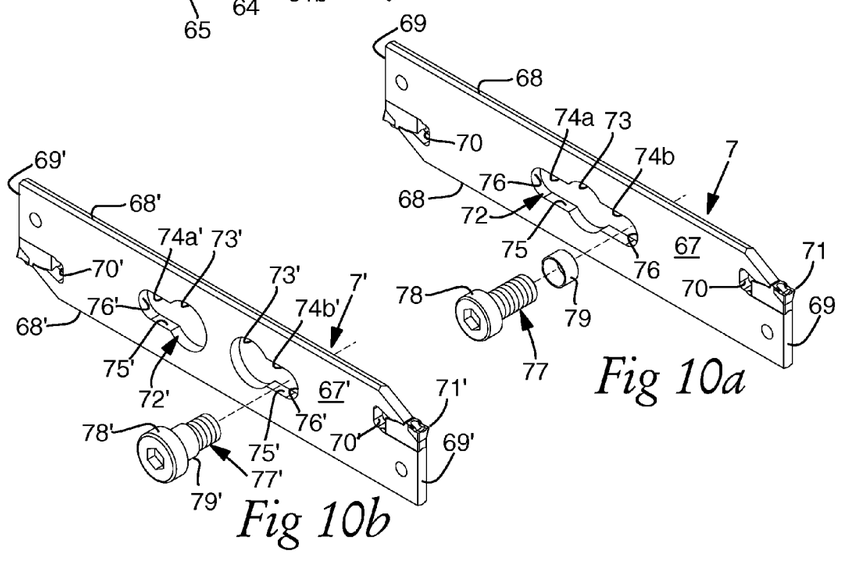
FIG. 10a is a perspective exploded view showing the holder blade and a fixing screw interacting with the same.
FIG. 10b is a perspective exploded view of an alternate embodiment of a holder blade and a fixing screw interacting with the same.

Reference is now made to FIG. 10a, which illustrates the design of the holder blade 7 according to an embodiment of the present disclosure. In a traditional way, this holder blade has an elongate, rectangular basic shape and comprises two plane-parallel side surfaces 67, two opposite and mutually parallel longitudinal edges 68, as well as two opposite ends 69 in the form of plane surfaces. In the area of a corner between an individual longitudinal edge 68 and an end surface 69, a seat 70 is formed, in which a replaceable cutting insert 71 (usually of cemented carbide) can be applied. In the example shown, the holder blade is formed with two diagonally opposite seats 70 for the receipt of two cutting inserts, one of which can operatively replace the other one by turning of the holder blade. The two longitudinal edges 68 are cross-sectionally V-shaped by including two flank surfaces located at an obtuse angle to each other, one of which can be applied against the edge surface 58 (see FIG. 13a).

In the holder blade 7, a hole, in its entirety designated 72, is recessed, which extends all the way through between the two side surfaces 67. Said hole 72 has a keyhole-like contour shape by including a circular, intermediate section 73 and two elongate sections 74a, 74b. Each such section 74a, 74b is delimited by two straight and mutually parallel hole edge surfaces 75, which converge in a common, semi-cylindrical end surface 76. The two end surfaces 76 are equidistantly separated from the adjacent seat 70 (or the end surface 69 adjacent to the same).

In the example shown, for the fixation of the holder blade 7 in the slot 56, neither more nor less than one screw 77 is used, which, like the other screws, includes a cylindrical head 78. This screw may be brought through a bushing designated 79, which is applied in the cylinder surface 62 of the hole 60 in the immediate vicinity of the bottom surface 57. In the mounted state, the bushing 79 forms a stop member that prevents axial displacement of the holder blade in a direction in relation to the support plate 11, viz. in the backward direction of the tool holder.

The screw head 78 has a diameter that is somewhat smaller than the central, circular section 73 of the hole 72. On the other hand, the diameter thereof is somewhat greater than the width of the straight section 74, which in turn is greater than the diameter of the male thread of the screw.

It should be evident that the holder blade 7 can pass the head 78 of the screw by being brought past the same via the intermediate section 73. When the holder blade is to be mounted or dismounted, the screw 77 can be held provisionally screwed-in in the hole 60 with the head 78 separated a distance from the bottom surface 57 of the slot. When the holder blade has been brought past the screw head and pressed against the bottom surface 57 of the slot, the same is displaced axially (toward the left in FIGS. 9/10) until the end surface 76 of the straight section meets the bushing 79. When this occurs, the screw can be finally tightened, the exact position of the holder blade in relation to the support plate 11 being determined by the bushing 79 and the screw 77 in combination with each other.

When a consumed cutting insert is to be replaced by an unused one, this can be affected by turning of the holder blade 7. This turning operation can be carried out quickly and efficiently by the simple measures of loosening the solitary screw 77 a bit, displacing the holder blade so that the screw head 78 is located right opposite the intermediate section 73 of the hole, turning the holder blade so that the unused cutting insert is located in the same position as the consumed one, and then fixation is made in the way described previously. In practice, these measures can be carried out with a minimal waste of time. No matter how the holder blade is turned, the cutting insert will be located in one and the same exact position in relation to the support plate 11, more precisely as a consequence of the two end surfaces 76 in the hole 72 being situated at equally large distances from the seats 70 and the cutting inserts 71 thereof.

FIG. 10b shows another embodiment in which a shoulder screw 77' is used instead of a bushing 79 and screw 77. The shoulder screw 77' has three sections: head 78', shoulder 79', and thread (see also FIG. 13b, in which it can be seen that the shoulder at one end connects to the screw head, and on the other end connects to the thread). In this embodiment, the blade 7' can be displaced axially until the end surface 76' of the straight section meets the shoulder 79' of the shoulder screw 77' instead of the bushing 79. In all other aspects, mounting of the holder blade 7' is made in a manner similar as explained in connection with FIG. 10a. Thus, the holder blade 7' can pass the head 78' of the shoulder screw 77' by being brought past the same via the circular section 73'. When the holder blade is to be mounted or dismounted, the shoulder screw 77' can be held provisionally screwed-in in the hole 60 with the head 78' separated a distance from the bottom surface 57 of the slot. When the holder 7' blade has been brought past the screw head 78' and pressed against the bottom surface 57 of the slot 56, the same is displaced axially until the end surface 76' of the straight section meets the shoulder 79' of the shoulder screw 77'. Thus, the shoulder 79' of the shoulder screw 77' forms a stop member. When this occurs, the shoulder screw 77' can be finally tightened, the exact position of the holder blade 7' in relation to the support plate 11 being determined by shoulder screw 77'.

As can be seen, also the cutting blade 7' shown in FIG. 10b is different to the cutting blade 7 shown in FIG. 10a. More precisely, the holder blade 7' have two separate through holes 72' having a keyhole-like contour, each keyhole-like contour including a single elongate section 74a'; 74b' running from a circular section 73', the end surfaces 76' of each elongate section being situated at the same axial distance from an adjacent seat and cutting insert, respectively. Also in this embodiment, change of the two cutting inserts can be carried out quickly and easily without the exact positioning thereof in relation to the machine centre being lost. It is of course evident that the shoulder screw can also be used in connection with the cutting blade according to FIG. 10a, and that the screw and bushing can be used in connection with the cutting blade according to FIG. 10b.

By means of the pairs of holes 61a/61b, 62a/62b, 63a/63b, the support plate 11 can be fixed in three different axial settings in relation to the set-up body 12. In addition, the possibilities of varying the setting options are doubled as a consequence of the set-up body 12 including two axially separated pairs of threaded holes 45. By selecting, on one hand, some one of the three through holes in the support plate 11, and, on the other hand, one or the other of the two pairs of threaded holes in the set-up body 12, the support body can be given six different settings in relation to the set-up body 12. The reason for the radial setting of the support plate, and thereby the holder blade, in relation to the set-up plate needing to be altered, may be that different tubes and/or different holder blades need differently long projections in relation to the tool holder.

In FIG. 8, it is seen how the sensor 39 is a rod, which at its rear end includes a stud applicable in the seat 38. At a front end, the sensor also includes a pulley that can roll against the envelope surface of the tube 2 to be machined.

As a matter of form it should be pointed out that the space-defining attributes used in this text, e.g. "upper" and "lower", "front" and "rear", etc., relate to the placement of the different components in the drawings, and not to the state when mounted in the machine.

Figure 3:
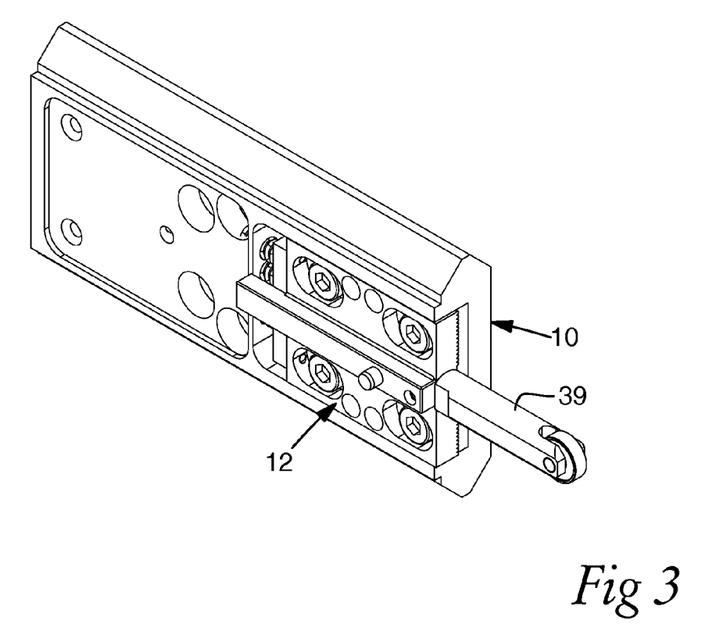
FIG. 3 is an analogous perspective view showing a basic body forming a part of the tool and from which a holder blade and an appurtenant support body have been removed, besides which a movable set-up body has been supplemented with a sensor.

To prepare the machine shown in FIG. 1 for operation, two primary measures are taken, viz. to ensure that all cutting inserts 71 for the four tools 4 are located at exactly the same radial distance from the tube 2 placed in the center C of the machine, and that the projection of the holder blades 7 from the tool holders 9 of the tools is optimum in respect of the diameter and wall thickness of the tube as well as of the nature of the selected holder blade. The first-mentioned measure occurs in a state where the support plate 11 is removed from the set-up plate 12, besides which the sensor 39 (see FIG. 3) is applied in the seat 38 of the set-up plate. When the fixing screws 34 of the set-up plate 12, after the setting of the tool and the pulley thereof toward the tube 2, are unscrewed a bit from the base plate 10, the set-up plate becomes movable so that the spring device 46 can displace the same so far that the sensor—via the pulley—comes into contact with the envelope surface of the tube. In this state, the set-up plate 12 is fixed in relation to the base plate 10 by the tightening of the four fixing screws 34. Such a position setting of the set-up plate 12 is repeated for each one of the four cutting tools 4 that are included in the machine 1.

Figure 17:
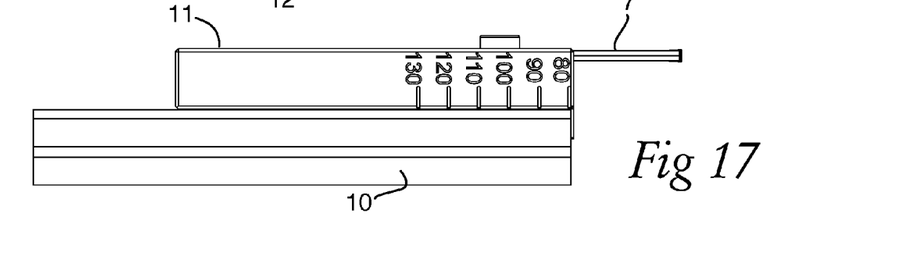
FIG. 17 is a view from line XVII-XVII of FIG. 15.

In the next step, the individual support plate 11 is connected with the preset set-up plate 12. This is affected in the following way: underneath the support plate 11 (see FIG. 17), there is a scale that marks the projection length of the holder blade 7 in relation to the base plate 10. In the scale, six indications of dimension are included, between which five intervals are present. The operator may, by selecting the desired projection length by means of the scale, manually displace the support plate 11 into a position in which the two screws 64 are to be tightened. The selected position corresponds with the position of the pin 43 in relation to any of the five pits 55 in the bottom of the slot 54. In a tactile way, the operator may distinctly establish said position and tighten the pairs of screws 64 in the pair of co-operating holes 45 in the set-up plate 12.

When the support plates 11 of all four tools 4 have been tightened, the holder blades 7 carried by the support plates will assume one and the same radial position in relation to the center C of the machine. In other words, all four, operative cutting inserts 71 are equidistantly separated from center C. The desired result of this is that all four cutting inserts will be worn essentially uniformly, and that all consumed cutting inserts can be replaced simultaneously.

Insert replacement may be carried out either by replacement of the individual cutting insert of the existing holder blade, or by the holder blade being turned. Turning can be effected by the screw 77 being unscrewed a bit to allow displacement of the holder blade, more precisely into a position in which the screw head 78 can be passed via the circular hole section 73. After turning of the holder blade and rotation of the same 180°, the same is remounted by being brought past the screw head 78 and displaced in such a way that the end surface 76 of the hole abuts against the bushing 79 serving as a stop member. Finally, the head 78 of the screw 77 is retightened against the holder blade, whereby the unused cutting insert indexed forward is fixed in the radial machine position that is determined by the axial position of the set-up body 12 in relation to the base plate 10.

An advantage is that a uniform and exact radial setting of the different holder blades can be carried out without the need of any time-consuming, manual line up and fine adjustment of the same. Thus, the uniformity and exactness of the positions is attained quickly and smoothly by means of the spring-loaded set-up plate arranged between the base plate and the support plate via the applied sensor. Another advantage, when the spatial position of the set-up plate and thereby of the support plate in the machine is established, is that replacement and/or turning of the holder blades can be carried out essentially by the simple hand grip of loosening a single screw and retighten the same. The advantageous result of this is that the set-up times for the machine in relation to the operative times are reduced to a minimum.

Although the holder blade forming a part of the cutting tool and usually being manufactured from steel has a longer service life than the cutting inserts that are usually manufactured from cemented carbide and become worn in a short time as a consequence of their immediate contact with the work piece, the same has, in spite of all, a limited service life in relation to the holder of the tool. For this reason, the holder blade is a component or product that can be marketed separately, i.e., without direct association with the assembled tool in its entirety.

The disclosure should not be limited only to the embodiment of the assembled cutting tool and the holder blade, respectively, described above and shown in the drawings. Thus, it is feasible to equip the holder blade with only one cutting insert, the keyhole-like hole not needing to include more than one straight section, in addition to the circular one. Although the bushing or shoulder screw serving as a stop for the displacement of the holder blade in a direction is a simple and inexpensive solution of the problem to locate the holder blade in the slot of the support body, also other solutions are possible. Thus, the holder blade could be brought in axially into the slot from one end thereof, besides which a stopping shoulder is formed at the opposite end. In such cases, the through hole in the holder blade necessary for the screw would not need to have a keyhole-like contour shape. Neither does the sensor detachably mountable on the set-up body need to be in the form of a rod having a rotatable pulley. For instance, for this purpose, a pin could be used having a tapering, front tip. Also the spring device for the automatic displacement of the set-up device may be formed in another way than in the form of a slat of the described kind actuated a by a plurality of helical coil springs. In those cases where the set-up body should be guided axially through two co-operating serration surfaces, the serration surface of the basic body could be formed directly in the bottom of the cavity instead of on a separate bottom plate of the type that is exemplified in the drawings.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A cutting tool, comprising:
   a tool holder including a basic body and a support body, the support body having a slot countersunk in a front side facing away from the basic body, the slot being delimited by a bottom and two mutually parallel limiting edges;
   a holder blade formed with at least one seat for a replaceable cutting insert, the holder blade having an elongate basic shape including two plane-parallel side surfaces, two opposite and mutually parallel longitudinal edges, and two opposite ends, the holder blade being detachably mounted in the slot and adjustable and fixable in different axial projection positions in relation to the basic body; and
   a set-up body arranged between the basic body and the support body, the set-up body being actuated by a spring device to displace the set-up body axially in relation to the basic body against a force of the spring device, the set-up body being fixable in a desired position in relation to the basic body by a screw joint, wherein the holder blade is fixed in a predetermined, axial position in the slot of the support body by a stop member including a screw that extends through a through hole through the holder blade and is tightened in a threaded hole that mouths in the bottom of the slot.

2. A cutting tool according to claim 1, wherein a width of the slot between the limiting edges is greater than a width of the holder blade between the longitudinal edges to allow mounting and dismounting of the holder blade with a side surface facing the bottom of the slot, the through hole in the holder blade having a keyhole-like contour shape including a circular section, a diameter of which is greater than a diameter of a screw head of the screw, and an elongate section that extends from the circular section to an end surface thereof, the elongate section having a width that is smaller than the diameter of the screw head.

3. A cutting tool according to claim 2, wherein the holder blade includes two seats disposed in corners between the longitudinal edges and ends of the holder blade, the through hole including two elongate sections running from a common, circular section, the end surfaces of which elongate sections are situated at equally large axial distances from adjacent seats.

4. A cutting tool according to claim 2, wherein the holder blade includes two seats disposed in corners between the longitudinal edges and ends of the holder blade, the holder blade having two separate through holes having a keyhole-like contour, each keyhole-like contour including a single elongate section running from a circular section, the end surfaces of each elongate section being situated at the same axial distance from adjacent seats.

5. A cutting tool according to claim 1, wherein the set-up body includes means for detachably receiving a projecting sensor for determining the axial position of the detached and spring-loaded set-up body in relation to the basic body depending on the distance to a work piece.

6. A cutting tool according to claim 1, wherein the support body is axially displaceable in relation to the set-up body via a guide in the form of a straight chute and a male member engaging the same.

7. A cutting tool according to claim 1, wherein the support body is fixable in one of a plurality of axial positions in relation to the set-up body by means of at least one fixing screw that extends through one of a plurality of axially separated holes through the support body and is tightened in a threaded hole in the set-up body.

8. A cutting tool according to claim 7, wherein in the set-up body there are included a plurality of threaded holes that are axially separated.

9. A holder blade for a cutting tool comprising:
two plane-parallel side surfaces;
two opposite and mutually parallel longitudinal edges;
two opposite ends;
two diagonally opposite seats for replaceable cutting inserts, the seats each having an elongate basic shape and being disposed in corners between the longitudinal edges and the ends; and
two separate through holes arranged to receive a single fixing screw, each through hole having a keyhole-like contour, each keyhole-like contour including a circular section and a single elongate section having an end surface and running from the circular section to the end surface, the elongate section having a width that is smaller than a diameter of the circular section, the end surfaces of each elongate section being disposed at the same axial distance from an adjacent seat, wherein the through holes are located equidistantly from the longitudinal edges, each through hole being oriented such that the elongate section of the through hole is parallel to the longitudinal edges, the end surface being part of the through hole located closest to the adjacent seat.

10. A holder blade according to claim 9, wherein the through hole of the holder blade includes two elongate sections running from a common, circular section to an end surface thereof, the end surfaces of the elongate sections being situated at equally large axial distances from adjacent seats.

* * * * *